United States Patent

Watamoto

[11] Patent Number: 5,990,966
[45] Date of Patent: *Nov. 23, 1999

[54] G-CODE DECODER FOR USE WITH A VIDEO TAPE RECORDER AND METHOD FOR SAME

[75] Inventor: Toru Watamoto, Settsu, Japan

[73] Assignee: Matsushita Electric Industrial Co., Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/660,038

[22] Filed: Jun. 6, 1996

[30] Foreign Application Priority Data

Jun. 8, 1995 [JP] Japan .................................. 7-141526

[51] Int. Cl.⁶ .............................. H04N 7/00; H04N 11/00
[52] U.S. Cl. ........................ 348/460; 348/906; 348/553; 348/552
[58] Field of Search ..................................... 348/553, 552, 348/460, 473, 474, 476, 477, 478, 906, 468; H04N 7/00, 11/00

[56] References Cited

U.S. PATENT DOCUMENTS

| | | | |
|---|---|---|---|
| 5,195,134 | 3/1993 | Inoue | 348/473 |
| 5,500,741 | 3/1996 | Baik et al. | 348/460 |
| 5,517,173 | 5/1996 | Mankovitz et al. | 348/732 |
| 5,532,761 | 7/1996 | Lee | 348/731 |
| 5,561,461 | 10/1996 | Landis et al. | 348/460 |
| 5,659,653 | 8/1997 | Diehl et al. | 348/460 |
| 5,774,357 | 6/1998 | Hoffberg et al. | 348/734 |

FOREIGN PATENT DOCUMENTS

| | | |
|---|---|---|
| 4-502681 | 5/1992 | Japan . |
| 4-301249 | 10/1992 | Japan . |
| 6-303564 | 10/1994 | Japan . |
| 90/07844 | 7/1990 | WIPO . |
| WO 94/28676 | 12/1994 | WIPO . |

OTHER PUBLICATIONS

Sony—Video Cassette Recorder Operating Instructions, 56 pages, ©1993 by Sony Corporation.
European Search Report relating to application No. 96304054.8 dated Nov. 18, 1997.

Primary Examiner—Nathan Flynn
Assistant Examiner—Vivek Srivastava
Attorney, Agent, or Firm—Ratner & Prestia

[57] ABSTRACT

A G-code decoder is coupled to a video tape recorder. When the G-code decoder detects that at least a portion of a G-code will be received or has been received, it checks whether a time clock has been set. If the time-setting is confirmed, the decoder decodes the G-code and terminates the decoding by a terminating means, and, if the time clock is found not to have been set, the decoder indicates the fact at least and terminates the G-code decoding.

8 Claims, 5 Drawing Sheets

G-CODE DECODER FOR USE WITH A VIDEO TAPE RECORDER AND METHOD FOR SAME

FIELD OF THE INVENTION

The present invention relates to a G-code decoder coupled to a video tape recorder (VTR), which is capable of decoding a G-code, and a method for the same, especially for entering the time-setting mode automatically when the G-code is to be decoded while the time is not yet set in the clock.

BACKGROUND OF THE INVENTION

In recent years, television receivers having VTRs, e.g., video cartridge recorders (VCRs), attached to them, sometimes built-in, and provided with means to decode a G-code, are becoming popular.

A G-code is a line of numerals formed by coding the year, month, day and the time of beginning and ending of a television program. If the G-code of a program is inputted in the apparatus, the code is decoded by the apparatus to begin and end the operation of the apparatus at the desired times.

According to the conventional G-code decoding process, the data is decoded based on the data and time held by the clock inside the apparatus, and, if the time is not set by the operator, decoding is based on a default value to output the data. For example, decoding is performed according to the time system having AM0:00 Jan. 1, 2000 as its staring time.

However, with such a conventional structure, if the time set by the operator or the default value is not known, so that the decoded data is based on the incorrect time, different data other than that desired is outputted and the desired program is not recorded.

The user could not be informed of the situation of time setting which might lead to incorrect decoding.

SUMMARY OF THE INVENTION

It is a goal of the present invention to overcome the above problem, and provide a television receiver having a VCR which tells the operator that the time is not yet set and asks the operator to set the present time.

A G-code decoder of a first exemplary embodiment for attaining the above objects according to the present invention is provided with a G-code decoding means comprising:

a detecting means to detect the depression of the G-code input key, a judging means to judge, after the detection, the setting state of the clock to determine whether the time is set, a G-code decoding means to decode the G-code when, by said judging means, setting of the time is affirmed, a terminating means to terminate the decoding process, when the G-code decoding is over, or when the judging means judges that the present time is not set.

In addition to the above embodiment, a warning means can be provided to warn by a sound or a synthesized voice, when the judging means judges the time has not been set.

A G-code decoder of a second exemplary embodiment for attaining the above objects according to the present invention is provided with a G-code decoding means comprising:

a detecting means to detect the depression of the G-code input key;

a judging means to judge, after the detection, the setting state of the clock to determine whether the time is set or not;

a decoder to decode the G-code, when the setting of the time is affirmed;

a time-setting means to indicate the non-setting of the time and request the setting of the time when the non-setting is judged by the judging means; and a terminating means to escape from the decoding process after the decoding or the setting of the time.

In addition to this structure, a warning means can be provided to warn by a sound or a synthesized voice, in addition to or instead of the indication, when the judging means judges the time has not been set.

Further, means are also provided to permit one to set the present time in the time-setting means.

A first exemplary method of decoding a G-code for attaining the above objects according to the present invention comprises the steps of:

detecting the depression of the G-code input key;

judging the setting state of the clock to determine whether the time is set;

decoding the G-code, when, by the step of judging, setting of the time is affirmed;

terminating the decoding process, when the G-code decoding is over, or when it is judged that the present time is not set.

In addition to this process, a warning step can be provided to warn by a sound or a synthesized voice that the time is not set.

A second exemplary method of decoding a G-code for attaining the above objects according to the present invention comprises the steps of:

detecting the depression of the G-code input key;

judging the setting state of the clock to determine whether the time is set or not;

decoding the G-code when the setting of the time is affirmed;

indicating the non-setting of the time and requesting the time to be set when the non-setting is judged; and escaping from the process of the decoding after the decoding or the setting of the time.

In addition to this process, a warning step can be provided to warn by a sound or a synthesized voice, in addition to or instead of the indication, when the non-setting of time is judged.

According to the above first structure or first method of the present invention, if the time has not been set when the G-code is inputted, the G-code is neither decoded nor indicated or the non-setting of the time is told the operator by electronic sound or synthetic voice.

According to the above second structure or second method, if the time has not been set when the G-code is inputted, the fact of non-setting of time is indicated on the screen or told and the setting of the present time is demanded.

Thus, according to the present invention, various troubles due to the non-setting of time, such as indicating the incorrect time or missing a desired program, can be avoided.

DETAILED DESCRIPTION OF THE EMBODIMENTS

First Embodiment

Figure 1:
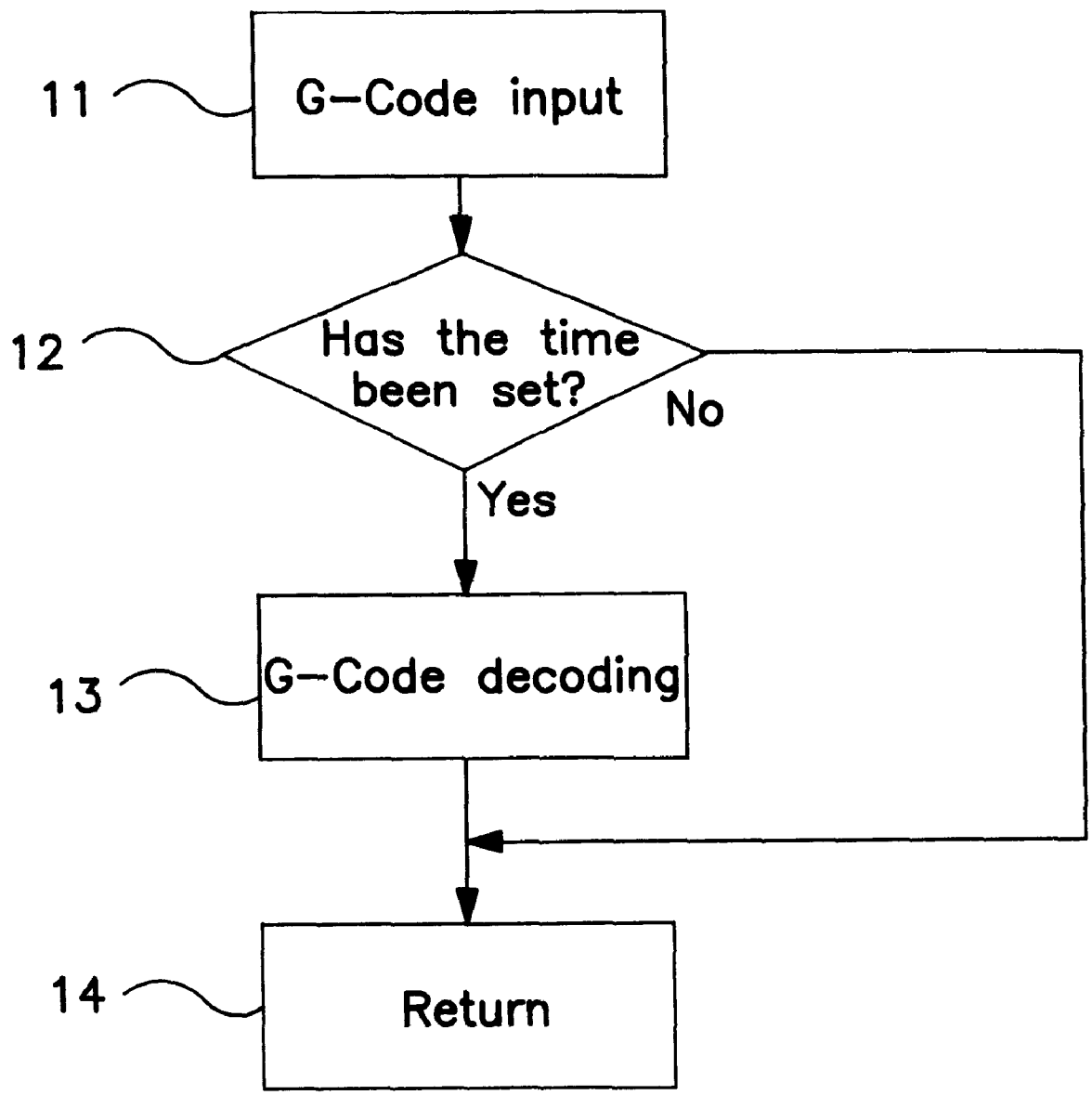
FIG. 1 is a flow chart showing a process of G-code decoding in a television receiver having a video cartridge recorder (VCR) of a first embodiment of the present invention.

Referring to FIG. 1, a process of G-code decoding according to the present invention comprises a G-code input routine 11, a branch 12, a G-code decoding routine 13, and a terminating routine 14.

If in the input routine 11, the G-code input key is depressed, in the branch 12, reference is made to the state of time setting of the clock, and, if the time has been set in the clock, decoding of the G-code is made in a G-code decoding routine 13, and if the time is not set, that is, the default time has not been corrected, the process terminates in routine 14 without doing anything further.

Thus, according to the first embodiment of the invention, when the G-code key is depressed, no operation begins if the time has not been set. This prevents the output of an undesired data to start recording, when the timer is employed, at an undesired time due to the start by the default time.

Figure 2:
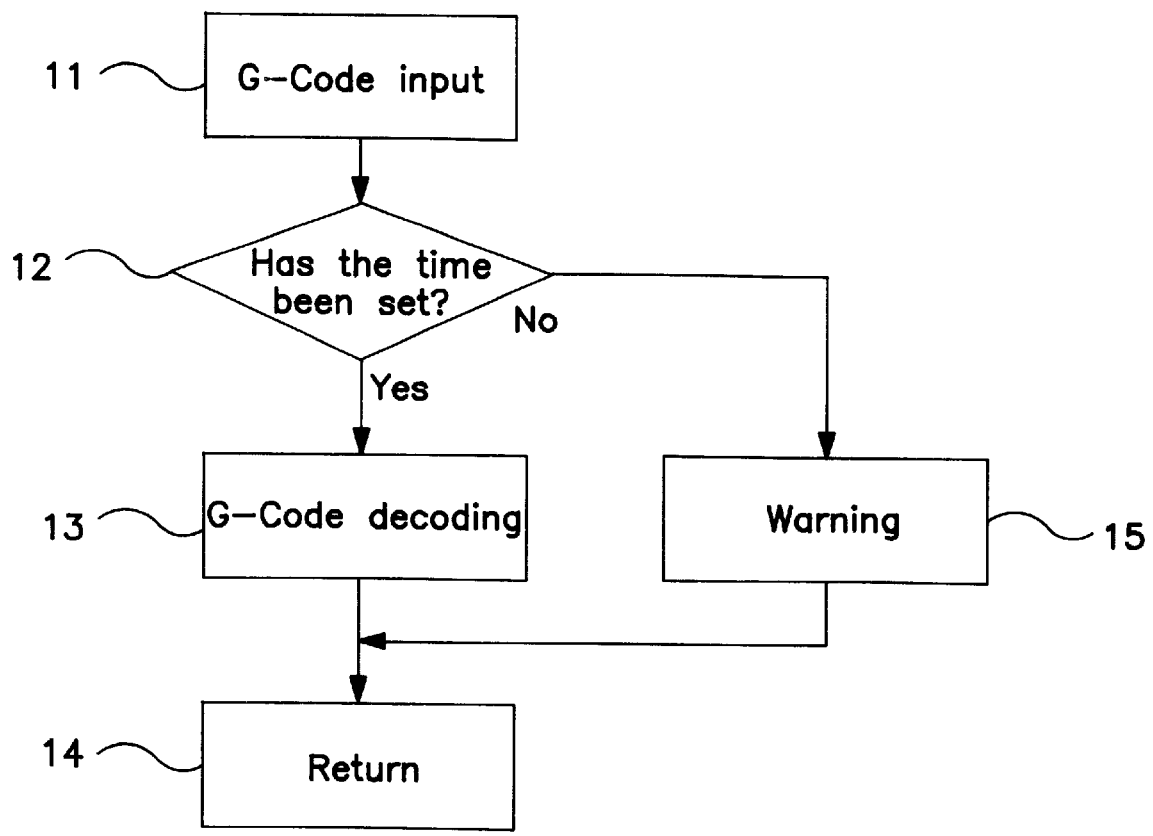
FIG. 2 is a flow chart showing a process of G-code decoding in a television receiver having a video cartridge recorder modified from that of the first embodiment.

A warning routine 15 may be added between the branch 12 and terminating routine 14 as illustrated in FIG. 2, which, when the time is not set, indicates the non-setting by an electronic sound or a synthesized voice. Each part with the same numeral in FIG. 2 as in FIG. 1 works in the same way as in FIG. 1.

Second Embodiment

Figure 3:
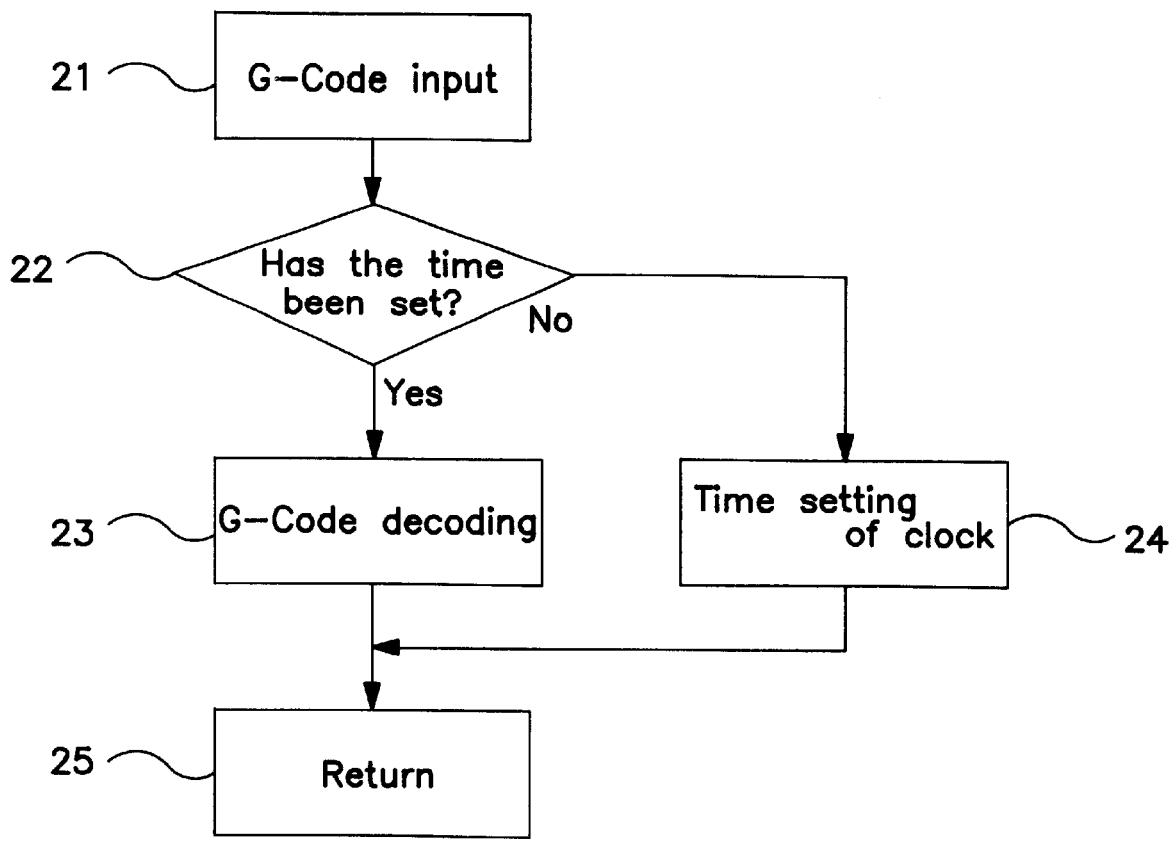
FIG. 3 is a flow chart showing a process of G-code decoding in a television receiver having a video cartridge recorder of a second embodiment of the present invention.
Figure 3A:
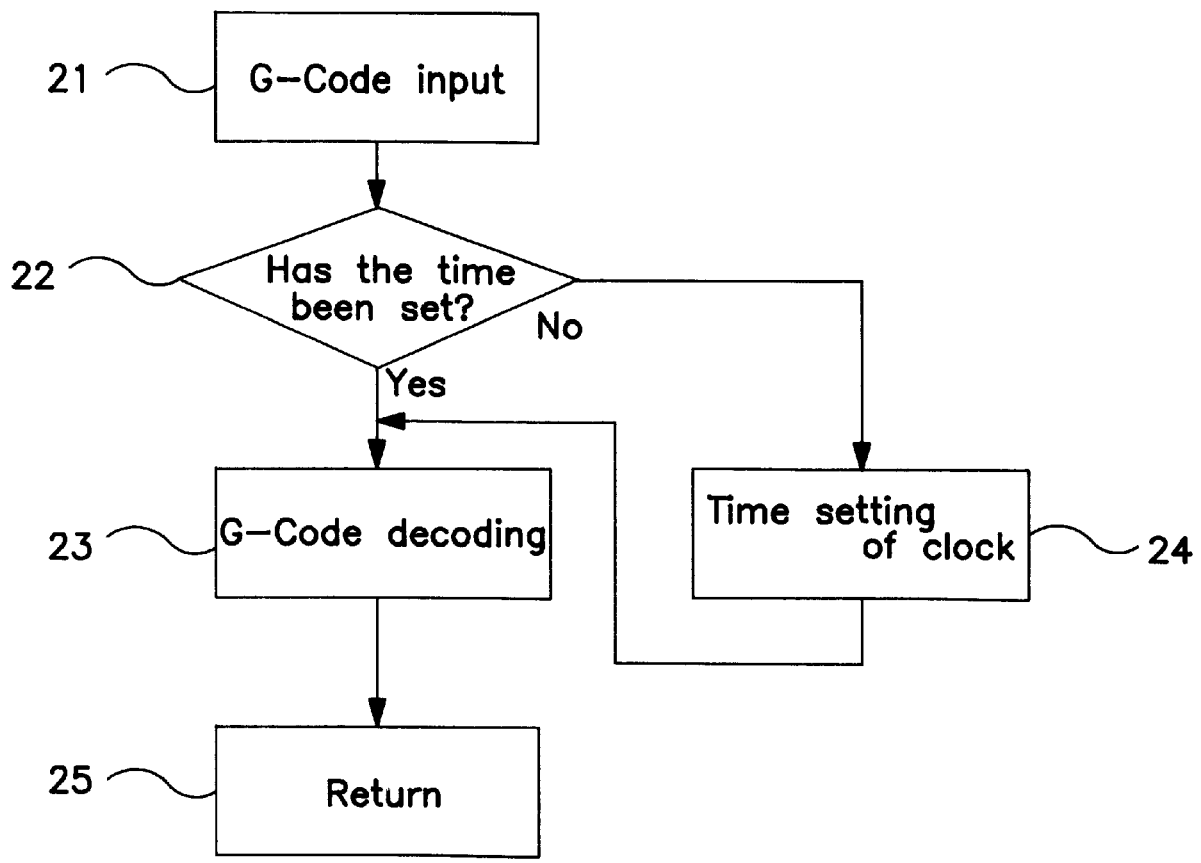

Referring to FIG. 3, a process of G-code decoding in a television receiver having a video cartridge recorder attached thereto comprises a G-code input routine 21, a branch 22, a G-code decoding routine 23, a time-setting mode routine 24, and a terminating routine 25.

Figure 4:
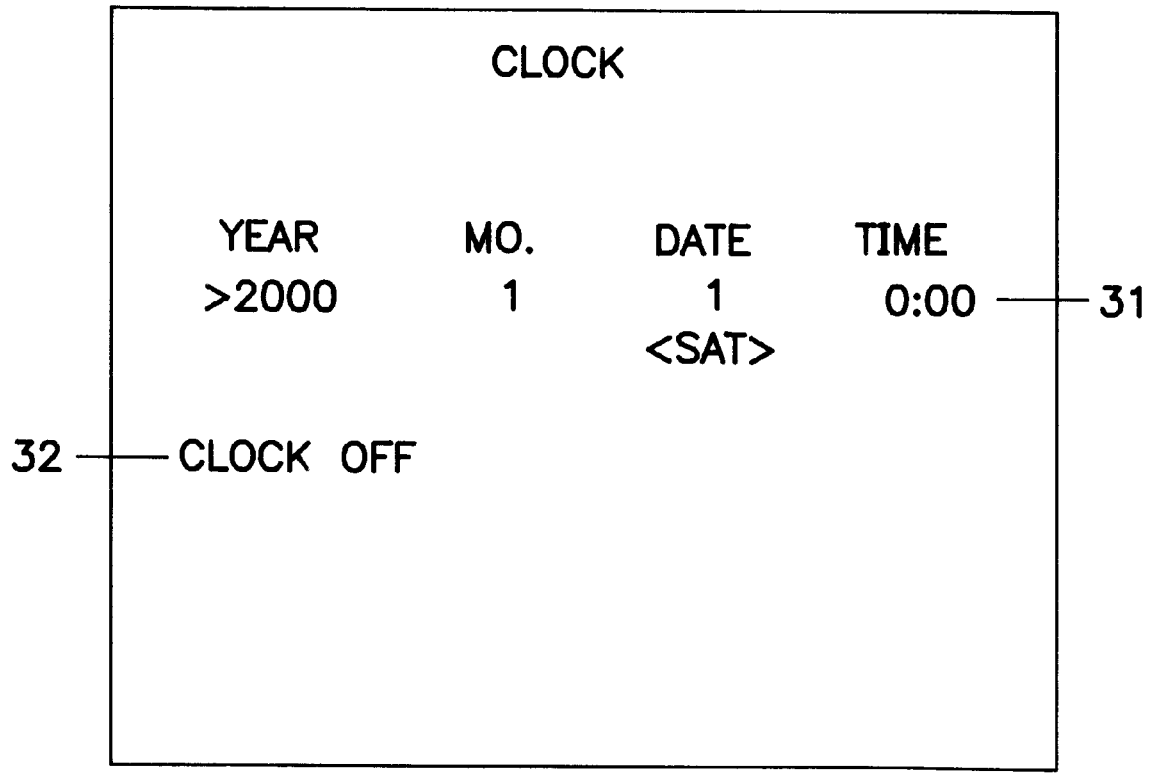
FIG. 4 is a chart showing a time setting state in the receiver of the second embodiment.

Referring to FIG. 4, a time-setting screen includes an item 31 to show the present time and date and an item 32 to show the setting state of the clock.

Referring to FIG. 3, when the G-code input key is depressed in the routine 21, and at the branch 22 the present state of the time setting is determined, and, if the present time has been set, the G-code decoding is made at the decoding routine 23 to show the result of the decoding at item 31 as well as other information and "CLOCK ON" at item 32, and to terminate through the routine 25.

If the time has not been set, an image is shown, as that shown in FIG. 4, to indicate "CLOCK OFF" by the item 32, demanding the input of the present time. If the operator inputs the present time, it is indicated in the item 31 and the process is terminated by the routine 25.

Thus, by being provided with a means for decoding a G-code when the time has not been set, to indicate the non-setting of the time and to enter the time-setting mode, the operator sets, in the time-setting mode screen as shown in FIG. 4, the year, month, day and time in the article 31 and changes the article 32 to "CLOCK ON".

As described above, in a television receiver having a VCR comprising a G-code decoding means, the present embodiment has a means to demand the input of the present time and indicate that the present time has not been set. Therefore, the operator can input the present time following an instruction and continue G-code decoding. This prevents a failure in the recording of a desired program due to the non-setting of the present time.

Instead of, or in addition to, the indication of the non-setting of the time on the screen in the time-setting mode routine 24, an alarm using an electronic sound or a synthetic voice can be used.

One method of determining the clock status is as follows. When the G-code input key is depressed, a value stored in a memory (not shown) which contains the present state of the time setting is accessed. If the value is "0", then it is determined that the present time has not been set, and therefore, the G-code decoding cannot occur and the time-setting screen is displayed. If the value is "1", then it is determined that the present time has been set, and therefore, the G-code decoding can occur.

One method of changing the clock status is as follows. A cursor is moved to select "CLOCK" in a main menu (not shown). This causes the time-setting screen of FIG. 4 to be displayed. The present time is then set. The cursor is then moved to select "CLOCK OFF". This causes "CLOCK ON" to be displayed. When "CLOCK OFF" changes to "CLOCK ON", the value in the memory is set to "1", which, as described above, corresponds to the present time being set. It should be noted that other methods of determining and changing the clock status may be used.

While specific embodiments of the invention have been illustrated and described herein, it is realized that modifications and changes will occur to those skilled in the art. It is therefore to be understood that the appended claims are intended to cover all modifications and changes as fall within the true spirit and scope of the invention.

What is claimed:

1. A G-code decoder for use with a VTR comprising:

input means for receiving a G-code;

detecting means for detecting that at least a portion of said G-code will be received or has been received;

judging means for determining whether a time clock has been set responsive to said detecting means detecting that said portion of said G-code will be received or has been received;

setting means for setting the time clock responsive to said judging means determining that the time clock is not set;

decoding means for i) decoding the G-code responsive to said setting means setting the time clock and ii) decoding the G-code responsive to said judging means determining that the time clock is set; and preventing means for i) preventing said decoding means from decoding the G-code if said judging means determines that the time clock is not set and ii) continuing to prevent said decoding means from decoding the G-code if said judging means determines that the time clock is not set.

2. A G-code decoder for use with a VTR according to claim 1, further comprising a warning means for at least one of i) sounding an alarm and ii) generating a synthesized voice when said judging means determines the time clock has not been set.

3. A method of decoding a G-code for use with a VTR comprising the steps of:

(a) receiving a G-code;

(b) judging whether a time clock has been set;

(c) detecting that at least a portion of said G-code has been received;

(d) decoding the G-code responsive to Step (b) determining that the time clock is set;

(e) always preventing the decoding of the G-code if the time clock is not set; and (f) always setting the time clock responsive to Step (b) determining that the time clock is not set and then decoding the G-code.

4. A G-code decoder for use with a VTR according to claim 1, wherein said setting means has an indicator for indicating at least a non-setting of the time clock.

5. A G-code decoder for use with a VTR according to claim 4, wherein said setting means further comprises warning means for sounding one of an alarm and a synthesized voice to indicate the non-setting of the time clock.

6. A method of decoding a G-code for use with a VTR according to claim 3, further comprising the step of warning by at least one of i) a sound and ii) a synthesized voice when the non-setting of the time clock is determined in Step (b).

7. A method of decoding a G-code for use with a VTR according to claim 3, further comprising the step of indicating at least the non-setting of the time clock when the non-setting is determined in Step (b).

8. A method of decoding a G-code for use with a VTR according to claim 7, further comprising the step of warning by one of i) a sound and ii) a synthesized voice the non-setting of the time clock.

* * * * *